June 6, 1944.  G. PINAZZA  2,350,921
POWER HAMMER
Filed Jan. 31, 1940   2 Sheets-Sheet 1
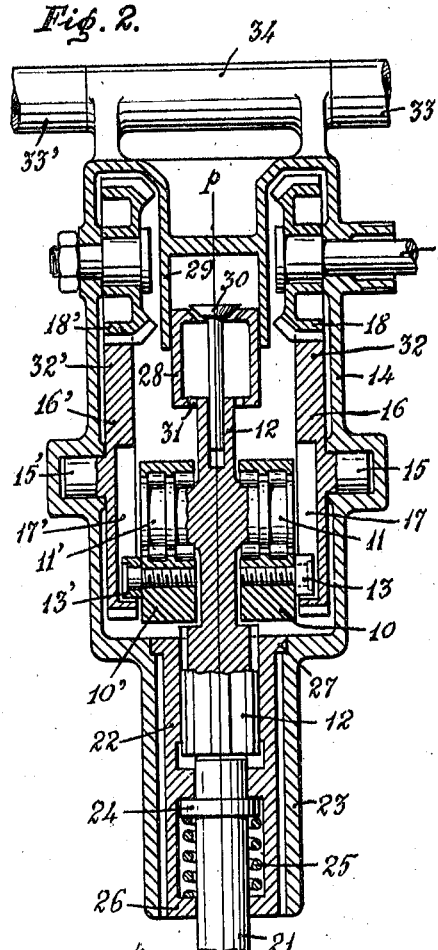
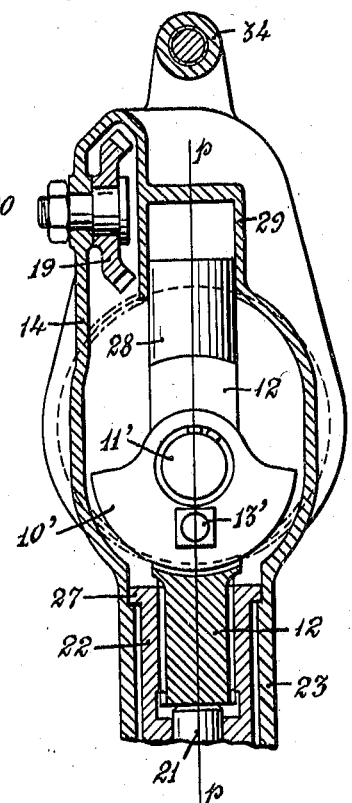
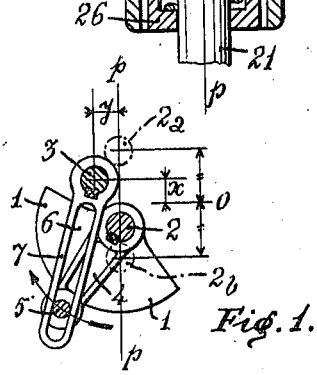
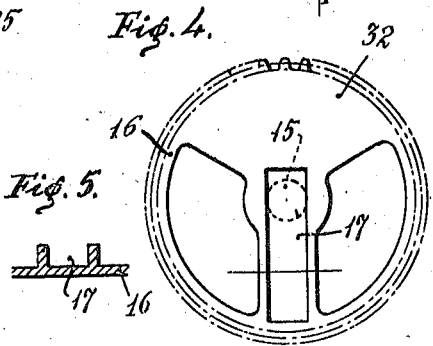
Inventor,
G. Pinazza
By Glascock Downing Seebold

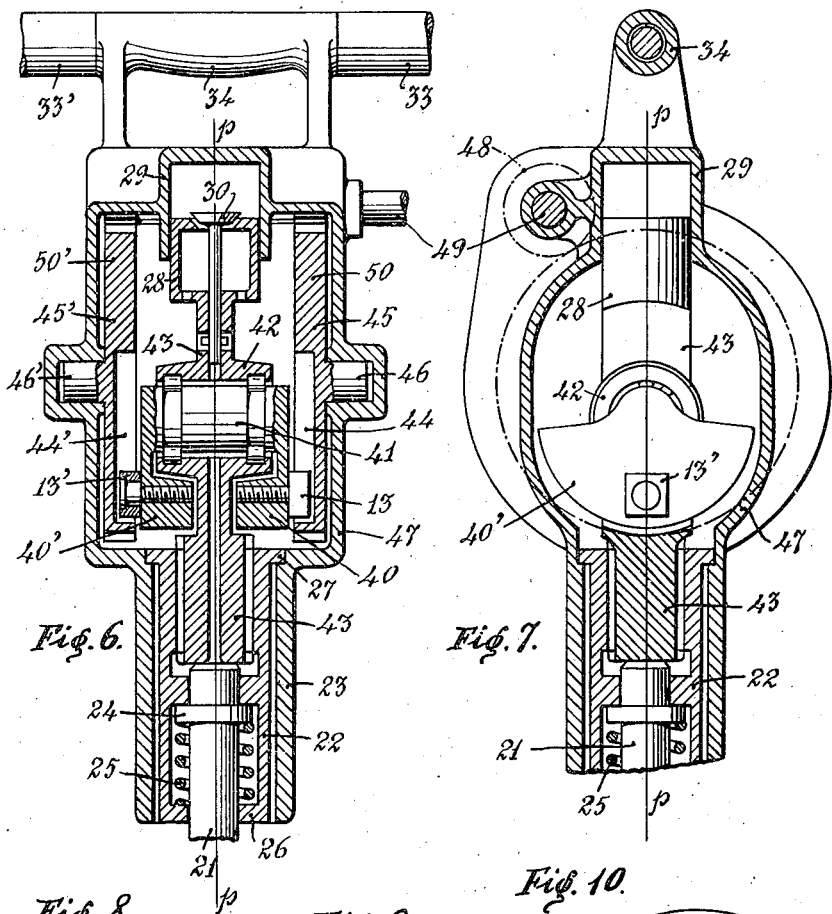
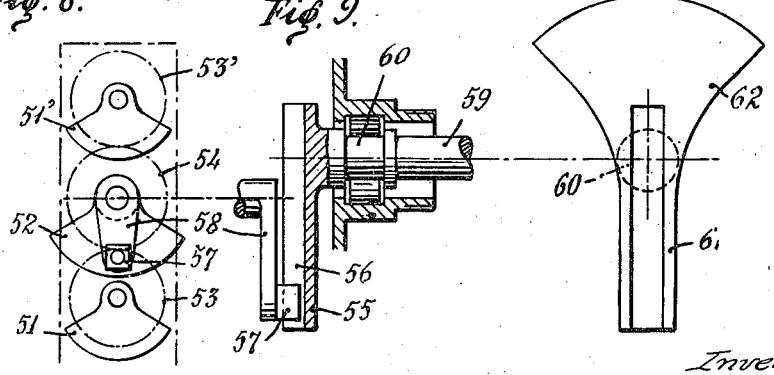

Patented June 6, 1944

2,350,921

UNITED STATES PATENT OFFICE 2,350,921

POWER HAMMER

Giosuè Pinazza, Milan, Italy; vested in the Alien Property Custodian

Application January 31, 1940, Serial No. 316,697
In Italy February 18, 1939

5 Claims. (Cl. 125—33)

There are already known percussion appliances in which the percussion force is the resultant of the centrifugal forces of eccentric masses rotating in the percussor. There are also known appliances in which the rotation of the masses is not uniform, but is periodically accelerated and retarded during each rotation of the masses, so that the aforesaid resulting force has a great intensity in the direction of the useful percussion, namely of the forward stroke of the percussor and has a small intensity in the opposite direction, namely of the backward stroke of the percussor. Heretofore, drive chains which engage wheels have been exclusively used in percussion appliances for setting the masses in action.

The present invention concerns a device for acting appliances having the construction mentioned, by means of which the velocity of rotation of the masses can be varied not only according to what has been stated, but also according to other laws and, moreover, one also obtains in the apparatus a more simple, a more compact and a more resistant structure, which is very suitable for high power.

The fundamental feature of the invention consists in the fact, that the driving shaft is connected to the rotating masses through the medium of at least one pair of crank arms, one of which is connected with the driving shaft and rotates uniformly, while the other is connected rigidly with the masses and having its own axis of rotation oscillating together with the striker whereby the lengths of these crank arms stand one with respect to the other in a periodically variable ratio during each rotation of said arms and of the masses.

In such a way, as the rotation of the driving crank arms, which are connected with the driving shaft, is a uniform one, and as the relation between the lengths of these arms and those of the driven crank arms, which are connected with the masses, varies during the rotation, the angular velocity of rotation of the masses proves to be necessarily variable, exactly as desired. Furthermore, there exists a perfect correspondence between the law of variation of said relation between the lengths of the crank arms and the law of variation of the angular velocity of the masses; so that, in order to obtain a certain degree of variation of the angular velocity of the masses, it is sufficient to establish a corresponding degree of variation of the said relation between the arm lengths.

The rotating axis of each crank arm connected with the driving shaft is firmly fixed on to the body of the apparatus, so that it does not change position with reference to it. The axis of rotation of each crank arm connected with the eccentric masses continually oscillates together with the percussor.

A second feature of invention consists in the fact, that the now and then desired law of periodical variation of said ratio existing between the lengths of the crank arms is obtained by means of the relative position of the fixed axis of rotation, and, of each crank arm connected with the driving shaft, in respect to the middle position of the rotation-axis of the corresponding crank arm connected with the masses. This middle portion is located midway between the amplitude of oscillation of this axis.

Thus, according to the effect desired, the position of the axis of rotation of each driving crank arm will coincide with the said middle position of the rotation-axis of the corresponding driven crank arm, or it will be situated longitudinally and/or transversally in relation to the same aforesaid middle position of the axis of rotation of the corresponding driven crank arm. Among the many and different cases that may occur in practice the one already taken into consideration at the beginning of the present description is of particular interest in that the rotation of the masses is accelerated during the forward stroke of the percussor and retarded during its backward stroke, for the purpose already stated.

According to another feature of the invention the medium position of the axis of rotation of the crank arm, connected with the masses and oscillating with the striker, is constantly maintained in the previously fixed position towards the fixed position of the axis of rotation of the crank arm, connected with the driving shaft, by a pneumatic cushion situated between the posterior end of the striker and the posterior bottom of the frame-work of the apparatus.

Furthermore, for the same purpose, a spring might be disposed between the anterior bottom of the frame-work and a collar of the tool, so that the stroke dealt by the striker upon the tool compresses the said spring. This is done in order to push the frame-work forward, so as to maintain the said relative position between the axes of rotation of the crank arms for the said pneumatic cushion tends to make retrograde the frame-work itself.

The connection between each driving crank arm and the corresponding driven crank arm can take place immediately, namely by direct engaging of one arm into the other, or also mediately, namely by interposing other connecting elements, and this according to requirements, both of constructive nature and relating to the various and manifold applications of the invention. Obviously, the direct engaging will be, for its simplicity, the one to be preferred, and in this case it will be sufficient that the point where the crank arms engage into each other could be shifted along the said arms.

The periodical variations of the velocity of the masses have the tendency of acting upon the driving cranks and of modifying their uniform rotating motion. In order to eliminate this effect and to free in some degree the driving shaft from the torsional strains resulting therefrom, and in order to preserve a constant and uniform rotation of this shaft, the crank arms connected with the driving shaft are, according to invention, jointly provided with eccentric masses acting upon them as stabilizing flywheels.

The masses may be so arranged, that their centers of gravity should all rotate in the same plane, or in parallel planes respectively, and all of them in the same direction, or some in one direction and the others in the opposite direction. In certain cases, for instance when the centers of gravity move in parallel planes, the masses give way to torsional moments or to moments of deviation, which tend to cause the apparatus either alternatively to rotate around the percussion axis or alternatively to deviate from said axis, respectively. According to the invention, these disturbances are at once equilibrated through the said eccentric masses applied jointly to the driving crank arms, by utilizing the moments with which they act upon the body of the apparatus by the medium of the pins of rotation of the arms which bear them.

Other less outstanding features, of a structural nature, of the invention, will appear during the description that follows and which refers to some practical examples. The examples are illustrated in the drawings enclosed, where they exactly represent:

Fig. 1 is a view showing, schematically, an elementary realization, illustrating the fundamental idea of the invention;

Fig. 2 is a view in axial section of the first example of the invention;

Fig. 3 is a view at a right angle with that of Fig. 2, partially in section, of the same executive example;

Fig. 4 is a detail view of the eccentric masses shown in Figs. 2 and 3;

Fig. 5 is a view in cross-section, taken through the lower portion of Fig. 4;

Figs. 6 and 7 show in analogous views to those of Figs. 2 and 3, another example of the operation of the invention;

Fig. 8 is a schematical front view, a variant of the disposition of the eccentric masses rotating in the percussor;

Fig. 9 is a view in axial section, of another example of driving crank;

Fig. 10 is a front view, of a variation of the example of Fig. 9.

In the Fig. 1, where the invention is realized in its simplest expression, there is indicated by 1 one of the eccentric masses, by 2 its pin of rotation on the striker and by 3 the driving shaft. The characters $p$—$p$ indicate the axis or path of oscillation of the striker which constitutes also the axis or path of oscillation of the pin 2; by 2a and 2b are indicated with dotted lines the extreme positions that the pin 2 reaches during oscillation. Its central or middle position does correspond to the axis 0, equidistant from the positions 2a and 2b. The mass 1 is firmly provided with a crank arm 4, and the pin 5 which runs freely in a slot 6, which slot is provided radially in a crank arm 7, set up rigidly on the driving shaft 3. The position of this shaft, the axis of which is fixed on the body of the apparatus, is established by the Cartesian coordinates $x$, $y$ in respect to the axle $p$—$p$ and to the central position 0 of the pivot 2. Upon the choice of these coordinates depends the degree of variation of the rotation velocity of the mass 1. In the case illustrated, if the rotation takes place in the direction of the arrow, the rotation of the mass is substantially retarded in the lower part and on the left hand side of its travel (on the left side seen from the reader in respect of the axle $p$—$p$), whilst the arm of the driving crank 7 becomes shorter as compared to the constant one of the driven crank 4, whereas on the higher part and at the right hand side of the travel, the rotation of the mass 1 is substantially accelerated as, then the arm of the driving crank arm 7 becomes longer with respect to that of the driven crank 4. The other manners of variation that could be arrived at from other figures of the coordinates $x$, $y$, not excluded the case of $x=o$, $y=o$, can be easily deduced.

In the executive example of the Figs. 2 to 5, the two eccentric rotating masses are designated by 10 and 10′, mounted turnably in opposite directions on a same rotation-pin 11—11′. This pin is fixed in the striker 12, which in the rotation region of the mass is flattened, in order that the two parallel planes of rotation of the masses be as near together as possible. Such nearness is convenient to reduce to the minimum the torsional couple produced by the masses, which tends to make the percussor rotate alternatively around the axis of percussion $p$—$p$.

Each of the two masses is provided with a crank pin 13, or 13′ respectively, at equal distance from the axis 11—11′, whilst in the body 14 are turnably mounted around coaxial pins 15, 15′ two discs 16, 16′, each one bearing a radial groove 17, 17′ respectively: therein can engage and run respectively the pins 13, 13′. The discs 16, 16′ are provided on their circumference with a toothed collar and are thus driven by two toothwheels 18, 18′ respectively, which also are provided with conic toothing and are connected one with another by means of a conic toothed pinion 19. This pinion, or one of the two wheels 18, 18′, is connected with the driving shaft 20 having uniform rotation. Owing to the pinion 19, the two discs 16, 16′ have uniform but opposite rotations, so that the masses 10, 10′ are rotating in the contrary directions. In this example the coordinates of the axle 15—15′ of the drive cranks are $x=a$ and $y=o$, $a$ being orientated toward the back of the body.

The numeral 21 designates the tool on which the percussor strikes; the latter is longitudinally grooved and is guided by a socket 22, which is internally provided with longitudinal grooves engaging into those of the percussor or striker. This socket is also provided with longitudinal external grooves engaging into the corresponding internal grooves applied on the face 23 of the body.

The tool is provided with a collar 24 bearing a compression spring 25, the other end of which bears against a collar 26 of the socket 22, which is axially and solidly connected to the body 14 by means of the collar 27. The back end of the percussor has a hollow piston 28, which runs tightly in a cylinder 29 of the body 14 and bears on its head a valve 30, which opens toward the cylinder-chamber. During the backward stroke of the percussor, the valve 30 is closed, compressing the air in the cylinder 29. Valve 30, opening again at the end of the forward stroke, serves to re-introduce into the cylinder box 29 the air eventually escaped due to imperfect packing of the piston. Into the piston 28 the air is introduced through openings 31.

In order to balance the moment of torsion produced by the masses around the axle $p-p$, the driving discs 16, 16' are provided with eccentric masses 32, 32' situated in a position diametrically opposed to the eccentric masses 10, 10' in respect of the axle 15, 15' of rotation of the same discs. These masses 32, 32' have also the other task of a fly-wheel, as already said above.

The toothed pinion 19 can be located on the upper bottom of the housing 14 and coaxially with axis $p-p$, and mounted directly upon a small stud situated between the two handles 33, 33', instead of the central crossing 34 bar.

In the example of the Figs. 6 and 7, the two eccentric masses 40, 40' form a single block with their shaft of rotation 41, but they both rotate in the same direction. Their shaft 41 rotates in a support 42 of the percussor 43, which also in this case is preferably flattened as much as possible between the masses. The masses are, as in the former case, provided with crank pins 13, 13', being in touch and running in radially arranged grooves 44, 44' of two discs 45, 45' being turnable on coaxial pinions 46, 46' which are mounted on the body 47. These discs are provided with toothing on the circumference set in motion through toothed pinions 48 which are keyed on the same driving shaft 49.

The other parts of this example are substantially identical to the parts in the preceding form, therefore, similar parts have the same reference numerals.

Also in this case the driving discs are provided with eccentric masses 50, 50' which, besides the function of a fly-wheel already established, have the task of balancing the cross shifting that the two eccentric masses 40, 40' tend to produce through their rotation in the same direction.

If the eccentric masses on the percussor have no tendency to produce torsions and deviations, as for instance has been said in the case of Fig. 8, in which there are three masses 51, 52, 51' in rotating motion in the same plane and being coupled together by gearings 53, 54, 53', then the driving discs above described can be substituted by a simple crank 55 which has a slot 56. Into the slot engages a pin 57 fixed on one of the eccentric masses, eventually by means of the crank 58. In this case the crank 55 can be acted directly by the drive shaft 59, without any use of gears, by rigidly joining to this shaft the pin of rotation 60 of the crank.

By the same elimination of gears one can operate also in the case of the Figs. 6 and 7, in which the two masses are solidarily joined together and in fact only one of them could be set in motion. One can also apply in such case the simplified device, as shown by Fig. 9, adopting, however, for the drive crank the structure shown by the Fig. 10, in which this crank 61 is being provided with an eccentric mass 62 for the already said aim. For the symmetrical balancing of disturbances already described, it will be convenient that a crank such as 61—62 be provided also for the other of the two masses rotating on the percussor.

During the present description one has taken into consideration the case in which each driven crank is provided with a pin and the corresponding driving one with a slot; but it is obvious, that one can also adopt the opposed structure, namely to provide with pin the driving cranks and with a slot the driven cranks. Further, instead of pins and slots, one can also adopt other movable engaging systems between the cranks: this, obviously, has no bearing on the fundamentals of the invention.

It is at any rate obvious and expressly understood, that the illustrated and described examples cannot be construed as a limitation of the invention and that, therefore, also each variation concerning them, as well as each other realisation pertaining to the basical idea underlying the invention enunciated in the first place, falls within the scope and under the protection of the present invention.

What I claim is:

1. A percussion apparatus including a frame, a striker mounted movably therein, eccentric masses turnably mounted on the striker, a driving shaft journalled in the frame, controlling means between the driving shaft and the striker comprising at least one driving crank arm rotatable in the frame and mechanically connected with the driving shaft and rotatable thereby, at least one driven crank arm rigidly connected with at least one of the masses and rotatable with the said mass around the axis of rotation of the said mass on the striker, a slot and crank drive connection between the free ends of said crank arms so that the arm of lever of at least one of them is automatically and periodically variable, means for maintaining the medium position of the axis of rotation of said driven crank arm in a fixed position with respect to the axis of rotation of the said driving crank arm, and means for securing the uniformity of the rotating motion of said driving crank arm.

2. A percussion apparatus according to claim 1, in which each of the crank arms that are connected with the driving shaft are provided with eccentric solidly joined masses which act as flywheel securing practically the uniformity of rotation of said arms and equilibrating the disturbances eventually exerted upon the apparatus by the eccentric masses rotating on the striker.

3. A percussion apparatus according to claim 1, in which the eccentric masses rotating on the striker are constituted by two equal parts which are symmetrically disposed to the axis of percussion and solidly joined between each other and to a driven crank arm so as to form a sole body which is actuated by a sole driving crank arm that is directly coupled to the driving shaft.

4. Apparatus according to claim 1, in which the eccentric masses rotating on the striker are constituted by two equal parts which are symmetrically disposed to the axis of percussion and solidly joined between each other and to two driven crank arms which are also symmetrically disposed to the axis of percussion, so as to form a sole body which is actuated by two driving crank arms one of them only is directly coupled to the driving shaft.

5. Apparatus as claimed in claim 1, in which the masses rotating on the striker are placed in the same plane and mechanically connected between each other for the reciprocal transmission of the motion, one of them only being actuated by a sole driving crank arm which is directly coupled to the driving shaft.

GIOSUÈ PINAZZA.